(12) United States Patent
Chau (10) Patent No.: US 9,583,074 B2
(45) Date of Patent: Feb. 28, 2017

(54) OPTIMIZATION OF LABEL PLACEMENTS IN STREET LEVEL IMAGES

(71) Applicant: Google Inc., Mountain View, CA (US)

(72) Inventor: Stephen Chau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 14/099,338

(22) Filed: Dec. 6, 2013

(65) Prior Publication Data

US 2015/0022555 A1 Jan. 22, 2015

Related U.S. Application Data

(63) Continuation of application No. 13/187,193, filed on Jul. 20, 2011, now abandoned.

(51) Int. Cl.
*G09G 5/377* (2006.01)
*G01C 21/36* (2006.01)

(52) U.S. Cl.
CPC ......... *G09G 5/377* (2013.01); *G01C 21/3673* (2013.01); *G09G 2360/10* (2013.01); *G09G 2370/02* (2013.01); *G09G 2370/20* (2013.01)

(58) Field of Classification Search
CPC ......... G06T 17/05; G06T 19/00; G06T 11/00; G06T 17/00; G06F 17/30241; G09B 28/106
USPC ................................. 345/419, 632; 715/815
See application file for complete search history.

(56) References Cited

U.S. PATENT DOCUMENTS 6,408,302 B1  6/2002  Lee et al.
7,414,637 B2  8/2008  Fogel et al.
7,557,736 B1  7/2009  Daily et al.
8,464,181 B1* 6/2013  Bailiang et al. .............. 715/848
2005/0018216 A1  1/2005  Barsness et al.
2006/0241859 A1  10/2006  Kimchi et al.
2007/0083408 A1  4/2007  Altberg et al.
2007/0083428 A1  4/2007  Goldstein
2009/0037103 A1  2/2009  Herbst et al.
2011/0131597 A1  6/2011  Cera et al.
2011/0321084 A1  12/2011  Takahashi et al.
2012/0300089 A1* 11/2012  Sbaiz et al. ............... 348/222.1

FOREIGN PATENT DOCUMENTS

NL    WO 2005124594 A1 * 12/2005  ......... G01C 21/3647

OTHER PUBLICATIONS

Bell, Blaine, Steven Feiner, and Tobias Höllerer. "View management for virtual and augmented reality." Proceedings of the 14th annual ACM symposium on User interface software and technology. ACM, 2001.*

(Continued)

*Primary Examiner* — Maurice L McDowell, Jr.
(74) *Attorney, Agent, or Firm* — Lerner, David, Littenberg, Krumholz & Mentlik, LLP (57) ABSTRACT

A system, computer-implemented method and computer-readable medium for labeling an image. A two-dimensional street-level image and a three-dimensional model representing at least a portion of the image's content are received. Data representing a label to annotate at least a portion of a building in the two dimensional image is also received. A determination is made using the three dimensional mode as to where position the label for presentation within the two-dimensional model such that the label does not obscure presentation of the building in the two-dimensional image.

23 Claims, 6 Drawing Sheets

(56) References Cited

OTHER PUBLICATIONS

Frueh, Christian, Siddharth Jain, and Avideh Zakhor. "Data processing algorithms for generating textured 3D building facade meshes from laser scans and camera images." International Journal of Computer Vision 61.2 (2005): 159-184.*
Snavely, N. et al., "Photo Tourism: Exploring Photo Collections in 3D," ACM Transactions on Graphics (SIGGRAPH Proceedings): vol. 25, No. 3: 835-846 (2006), accessed at http://phototour.cs.washington.edu/Photo_Tourism.pdf, accessed on May 24, 2012, 12 pages.
Zhang, B. et al., "Annotating and Navigating Tourist Videos," ACM GIS '10, San Jose, CA (Nov. 2-5, 2010), accessed at http://research.microsoft.com/pubs/149304/Zhang_AnnotateVideos.pdf, accessed on May 24, 2012, 10 pages.
U.S. Appl. No. 13/187,193, filed on Jul. 20, 2011.

* cited by examiner

OPTIMIZATION OF LABEL PLACEMENTS IN STREET LEVEL IMAGES

CROSS-REFERENCE TO RELATED APPLICATIONS

This application is a continuation of U.S. patent application Ser. No. 13/187,193, filed Jul. 20, 2011, now pending, which is herein incorporated by reference in its entirety.

BACKGROUND

As mobile devices become accessible and popular, users use them to view cities, neighborhoods and blocks. For example, instead of using a conventional map, a user is able to download a map of a city onto a mobile device that includes real-world images geocoded and specific locations. The objects in those real-world images may be labeled to identify and annotate the object. In examples, the objects may include the streets, buildings, restaurants, retail outlets, landmarks, bridges. Other images that are presented to the user may include advertisements that are interesting to the user.

However, the labels often obstruct the object within the image and interfere with the presentation of the image to the user. For example, a label may obstruct the restaurant that is associated with the label or obstruct an integral portion of a landmark that the label describes. Similarly, the label may obstruct other portions of the image. In another example, advertisements that are presented to a user for viewing the image may also interfere with the user's experience as they may obstruct the interesting objects the image.

BRIEF SUMMARY

A system, computer-implemented method and computer-readable medium for labeling an image. A two-dimensional street-level image and a three-dimensional model representing at least a portion of the image's content are received. Data representing a label to annotate at least a portion of a building in the two dimensional image is also received. A determination is made using the three dimensional mode as to where position the label for presentation within the two-dimensional model such that the label does not obscure presentation of the building in the two-dimensional image.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The invention appends labels to a reconstructed an image of a real world location that is displayed on a computing device, such that the labels do not interfere with the presentation of an image to the user. For example, when an image is processed in the image processing system, the image processing system identifies the objects in the image that require labels. Unlike conventional systems that simply append the label on the object and thus interfere with the user's viewing of the object or other objects, the image processing system identifiers object in the image, such as a road or a sky, that can include the label without the label interfering with the viewing experience of a user and appends the label on the identified object.

System

Figure 1:
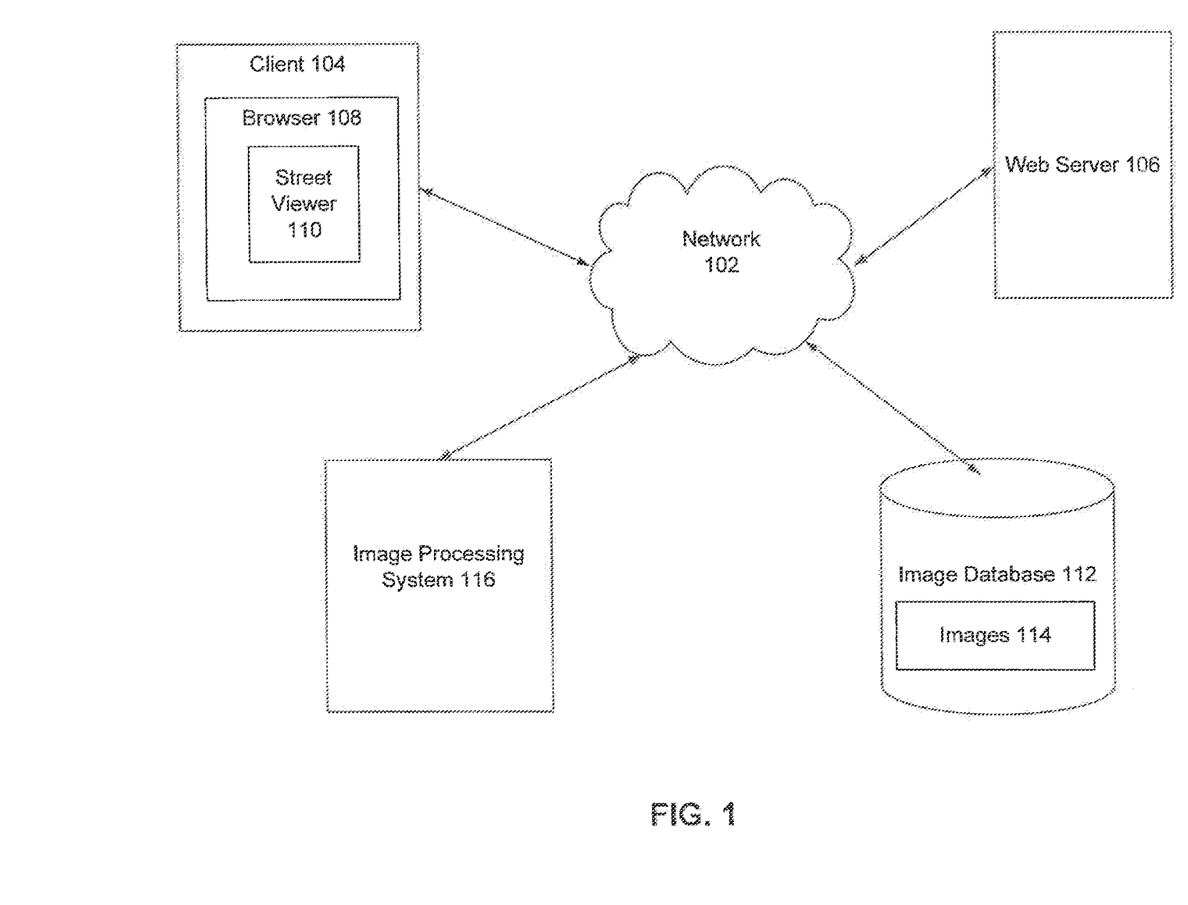
FIG. 1 is a block diagram of a distributed system in which embodiments can be implemented.

FIG. 1 is a block diagram of a client-server environment 100. Client-server environment 100 includes one or more networks 102, clients 104, and web servers 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web") protocols and/or services. Intermediate web servers, gateways, or other servers may be provided between components of the system shown in FIG. 1, depending upon a particular application or environment.

Client 104 is an electronic device that accepts input from a user and is capable of requesting and receiving resources over network 102. Example clients 104 are personal computers, mobile communication devices and tablet computers. Client 104 typically includes an application, such as a web browser (or simply browser) 108. Browser 108 facilitates the sending and receiving of data and resources over network 102 and the displaying of data on client 104.

A user uses browser 108 to request resources over network 102. A user requests resources either by typing the resource address associated with resource. In response to a request, web server 106 delivers resources as websites to client 104. When client receives a website from web server 106, client 104 uses browser 108 to display the website to the user.

Web server 106 is a computing device or an application executing on a computing device that helps deliver resources to clients 104. Resources are either stored on web server 106 or on another computing device that is accessible to web server 106 through network 102.

A street viewer 110 is an example of a resource that may be delivered to client 104 and viewed using browser 108. Street viewer 110 may be hosted on web server 106 and may be accessed by client 104 using a resource address. When a website that includes street viewer 110 is downloaded onto client 104, street viewer 110 allows client 104 to display images of a real-world location on browser 108.

Street viewer 110 displays images of locations around the world. For example, street viewer 110 displays street-level imagery of cities, landmarks, street corners, museums, etc. Street viewer 110 requests images of a real-world locations, from image database 112. Street viewer 110 obtains the coordinates, when, for example, a user is presented with a map of city or a city block, displayed as squares or rectangles and requests an image of the location by positioning the cursor on a particular location on the map. In an embodiment, street viewer 110 converts the coordinates indicated by the cursor into geographic coordinates such as a longitude and latitude coordinates and sends the request with those coordinates to image database 112 or to an intermediate web server, such as server 106 that in turn accesses image database 112.

Image database 112 stores image 114. Image 114 is a reconstructed image that was reconstructed from the camera and laser data. In an example, image 114 may include both a panoramic image and corresponding depth map. Each image 114 is associated with image coordinates that correspond to the real-world location of image 114. In an embodiment, image 114 may include labels. Labels on image 114 describe objects, such as restaurants, landmarks, buildings, etc. included in image 114. Unlike labels in the conventional images, labels in image 114 are annotated to objects in image 114 such that the labels do not interfere with the experience of the user viewing the image. Example objects in image 114 that can include labels are objects presenting a road or a sky, if any.

When a user desires to view image 114 of a particular location, a user uses street viewer 110 to retrieve and display image 114. For example, a user clicks on a map-like representation of a city in street viewer 110 that includes geographic coordinates of image 114. Street viewer 110 then generates a message to image database 112 that includes the geographic coordinates of image 114. In response, image database 112 retrieves image 114 that is associated with the requested geographic coordinates and returns image 114 to client 104, where image 114 is displayed using street viewer 110.

A person skilled in the art will appreciate that image database 112 may be any type of a memory storage device, such as a database, a server, a repository, or other storage device known to a person skilled in the relevant art. Image database 112 may be included on web server 106 or another computing or storage device that communicates with web server 106 using network 102.

Images 114 are collected, for example, using a car equipped with a camera, a laser sensor, and a GPS device. When a car is driven around a neighborhood, the camera takes pictures of the neighborhood at configurable intervals, such as every "f" feet, or every "t" seconds.

Laser sensors (e.g., LIDAR sensors) generate a point cloud representation of the objects within the neighborhood. A point cloud representation is a representation of the dimensions of the real-world objects, such as buildings, facades, windows, etc. within the image. For example, a laser generates a beam that is aimed at different objects within a location, such as a neighborhood. The sensor associated with the laser collects the laser beam that is reflected from the real-world objects and generates a point cloud in the (x, y, z) coordinate system that is based on the collected laser beam. A person skilled in the art will appreciate that an "x" coordinate indicates the horizontal axis in the point cloud, a "y" coordinate indicates a vertical axis in the point cloud, and a "z" coordinate indicates a depth in the point cloud. Thus, when a laser sprays a laser beam onto the building, the resulting point cloud reflects the facade, roof, windows, doors, etc. that are of varying depths of the sprayed building. The person skilled in the art will appreciate that the denser the laser spray, the more accurate the point cloud of the actual real-world object is produced. Laser sensors may also determine a representation of a sky in the point cloud by identifying points in the point cloud that have an infinite "z" coordinate, as the laser does not reflect back to the laser sensor when the laser points at the sky. Laser sensors may also determine a representation of a road in a point cloud by determining a shape that has a constant or near constant "y" coordinate.

The GPS device collects the real-world coordinates that correspond to the image produced by a camera and a point cloud generated by a laser. For example, GPS device collects the real-world coordinates at the same time as a camera takes a picture. In further embodiments, accuracy of the GPS data may be improved using wheel encoders installed on the vehicle, and the location data may be snapped to known locations of streets.

As mentioned above, the camera may successively collect images at various points along a path. In an example, the camera may be a panoramic camera with multiple image sensors that captures images from different directions coincidentally. The images may then be stitched together into a 360-degree panoramic image. The panoramic image may be associated with a geographic location collected by the GPS device at the time that the image was taken.

Any three-dimensional laser data collected at that time may also be associated with the same geographic location. For example, the point cloud may be used to generate a depth map representing three-dimensional data corresponding to respective pixels in the panoramic image. The depth map may include a numeric value corresponding to each pixel on the panoramic image. The numeric value represents a distance from the associated geographic location (collected by the GPS) to an object in three-dimensional space, such as a tree or building.

Figure 2:
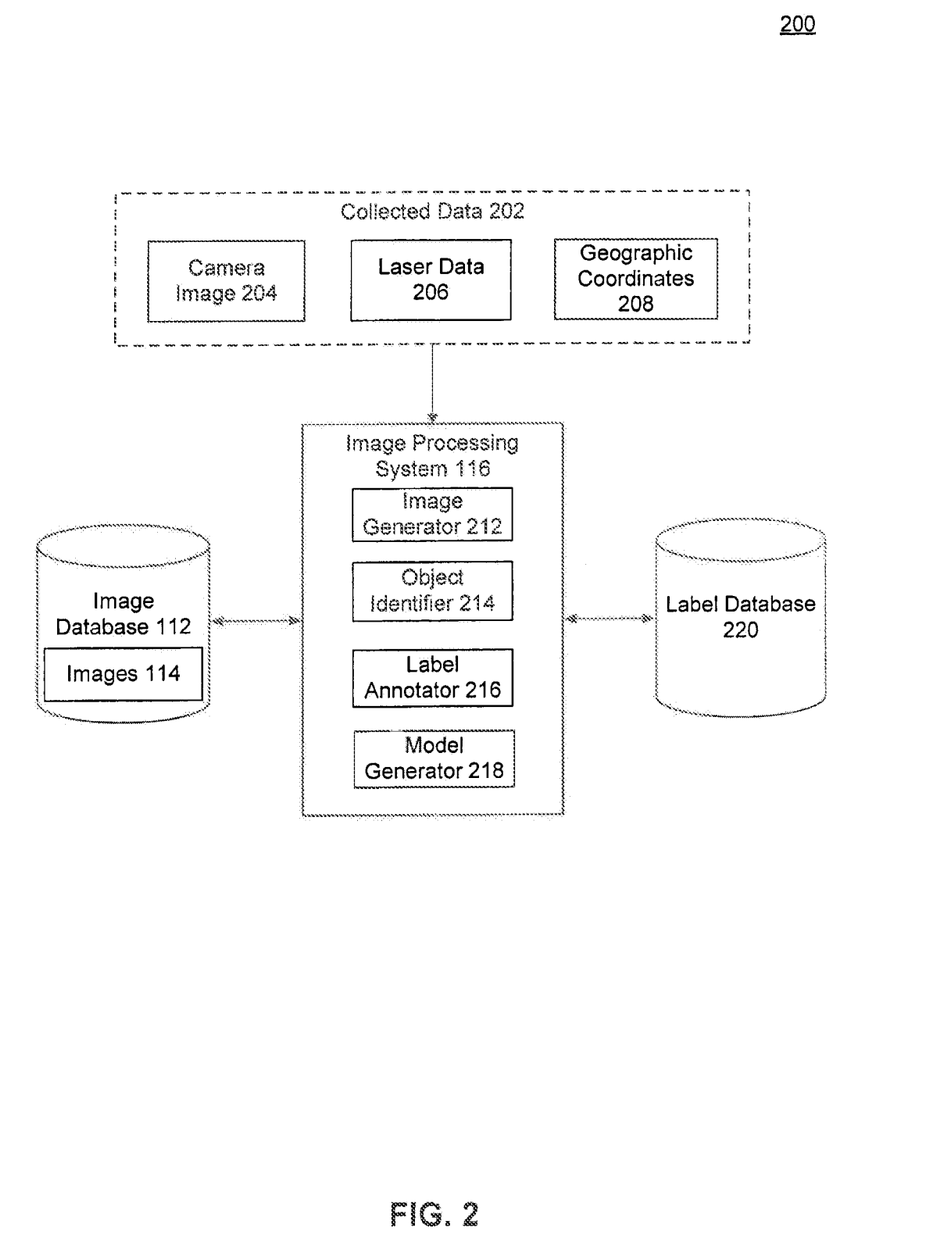
FIG. 2 is a block diagram of an image processing system, according to an embodiment.

After the data is collected, the data is sent to image processing system 116. FIG. 2 is a block diagram 200 showing an image processing system, according to an embodiment. Image processing system 116 processes images 114 from a collected data 202. Image processing system 116 receives collected data 202 that, for example, includes data from a camera, a GPS device and a laser sensor. In an embodiment, collected data 202 may be uploaded to image processing system 116 from a portable memory device or using network 102.

Collected data 202 includes camera image 204, laser data 206, and geographic coordinates 208. Camera image 204 may be a JPG, GIF, TIFF, PNG, BMP or any other image type known to a person of ordinary skill in the art. Laser data 206 is a point cloud representation of image 204, and geographic coordinates 208 are the real-world coordinates of the image 204 as identifies by the GPS device. In an embodiment, laser data 206 includes a point cloud which is a set of vertices in a 3D coordinate system using "x", "y" and "z" coordinates. Typically, when the laser sprays the laser beam onto a real-world object, laser data 206 may be included in a data file that image generator 212 receives and processes. In another embodiment, geographic coordinates 208 may be generated without use of LIDAR. For example, geographic coordinates 208, such as using a structure-from-motion algorithm. In that embodiment, features from the respective photographs taken along a street may be detected and matched with one another. As a result of the detection and matching, pairs of corresponding two-dimensional points on the photographs may be identified. For each pair of two-dimensional points, a point in three-dimensional space may be calculated using stereo triangulation. In this way, cloud of points 102 may also be determined using photographic images.

Image processing system 116 includes an image generator 212, an object identifier 214 and a label annotator 216. Object generator 212 retrieves camera image 204 and laser data 206 from collected data 202 and generates a panoramic image.

Image generator 212 generates image 114 from camera image 204 and laser data 206. Generating image 114 may involve stitching together multiple camera images. In an example embodiment, image 114 may be texture mapped to a three-dimensional model such as a sphere, cylinder, or a three-dimensional model generated by model generator 218 from laser data 206.

Model generator 218 derives a three-dimensional model from laser data 206 for geographic coordinates 208. The derived three-dimensional model represents at least a portion of the content within image 114's field of view. To generate the three-dimensional model, three dimensional shapes or facades may be fit into geographic coordinates 208 using search and optimization techniques. In one example, a shape may be selected from a plurality of primitive shapes. The plurality of primitive shapes may include a box, gable, hip, pyramid, top-flat pyramid, cylinder or ramp. With a shape selected, geometric parameters defining aspects of the shape may be optimized. The geometric parameters may include, for example, a position of an origin point (e.g., x, y, and z coordinates), a scale (e.g., height and width), and orientation (e.g., pan, tilt, and roll). The geometric parameters may be optimized using a best-fit or regression analysis algorithm, such as least-squares, or an adaptive optimization algorithm. Examples of adaptive optimization algorithms include, but are not limited to, a hill-climbing algorithm, a stochastic hill-climbing algorithm, an A-star algorithm, and a genetic algorithm. Different geometric shapes may be tried, and a shape having the best fit (as determined by a cost function) may be selected. Similarly, planes may be fit to geographic coordinates 208 to represent building facades and street facades.

When image 114 and its corresponding three-dimensional model have been determined, object identifier 214 determines the types of objects displayed in the 3D representation of image 114. For example, object identifier 214 determined, based at least in part on the three-dimensional model data, the location of objects in image 114, such as buildings, roads, sky, cars, etc. Object identifier 214 may extract the location of objects from the three-dimensional data using a variety of heuristics. In a first example, object identifier 214 identifies that an object is a sky by identifying coordinates in laser data 208 that have an infinite "z". In a second example, object identifier 214 identifies that an object is a road by identifying a horizontal facade below a predetermined elevation, e.g., to distinguish between horizontal facades representing roofs and those representing streets. In a third example, object identifier may identify that an object is a building by detecting vertical, or substantially vertical, facades that run along a street, perhaps parallel with a street.

Object identifier 214 may also determine the area of image 114 occupied by each detected object. This may involve matching three-dimensional model data representing the object to an area of a two dimensional image. In an embodiment where the three-dimensional model data is represented as a depth map, the pixels representing the object in the two-dimensional image may be identified using the corresponding pixels in the depth map representing the object. In an embodiment where the there-dimensional model data is represented in a three-dimensional coordinate system, a projection may be needed to determine the area occupied by the image. For example, using data representing a camera that took the image (such as position, angle and focal length), the three-dimensional data representing the object may be projected onto the two-dimensional image 114. When object identifier 214 identifies an object in image 114, object identifier stores the type of the object and the area occupied by the object in credential data associated with each object in image 114.

Image processing system 116 uses label annotator 216 to annotate labels to image 114 that allow a user to access information that describes the objects included in image 114. Label annotator 216 annotates labels to objects in image 114, such that the labels do not interfere with the presentation of image 114 to the user.

Label annotator 216 accesses the object type that is associated with each object in image 114 and, based on the object type, determines objects that require labels. For example, objects in image 114 that include restaurants, shops, landmarks, street signs, etc. may require labels.

In an embodiment, label annotator 216 may receive a listing of labels and the associated information about the objects located at a particular location in image 114 from label database 220 (described below). In an example, label annotator 216 may label database 220, a listing of labels associated with image 114. In another example, each label may have a geocode identifying a geographic location of an object that it annotates, and image 114 may have a geocode representing a position of a camera when it took image 114. In that example, label annotator 216 may retrieve labels geocoded in proximity to the geocode associated with image 114.

Typically, in conventional systems labels are presented directly on the image where an object associated with a label is located or at a fixed offset from the object's location. For example, in conventional systems if an image describes a building with a restaurant on the ground floor the conventional system will include the label of the restaurant where the restaurant is located. This may result in a negative user experience because the label of the restaurant may obstruct the building, the restaurant or other landmarks in the image that are interesting to the user. Similarly, when an image includes a landmark, such as an Eiffel Towel, a conventional system will place the label over the Eiffel Tower. Again, this will result in a negative user experience as the Eiffel Tower presented to a user may be obstructed by the Eiffel Tower label.

Unlike conventional systems, label annotator 216 overlays labels that describe an object, on an object that is not interesting to the user. Label annotator 216 may place labels on objects that represent a road or a sky on image 114. For example, if an object in image 114 includes a restaurant on the ground floor of a building, label annotator 216 appends the label that describes a restaurant on an object that represents the sky. In another example, in the image of an Eiffel Tower label annotator 216 may include the label of an Eiffel Tower in the sky above the Eiffel Tower or on a road that leads to the Eiffel Tower. As a result, when a user is presented with image 114 on street viewer 110, the objects in image 114 that are of interest to the user are not obstructed by the labels.

Label database 220 includes labels for objects that are streets, and businesses, landmarks, etc. that correspond to the real-world location presented in image 114. For example, label database 220 may include labels for a real-world location that corresponds to geographic coordinates 208. Labels typically include information or describe an object associated with the label. Additionally, label database 220 may include links to a website of an object, advertisements and other information that may be associated with a label.

In an embodiment, label annotator 216 may insert a pointer from the label to an object that a label describes. For example, label annotator 216 may include a pointer from a label appended to a sky to a restaurant or a landmark on image 114 that the label describes. An example pointer may be an opaque line, dotted line, etc., such that the label does not interfere with the presentation of image 114 to the user.

A label may display information about the associated object when the label is activated. To active a label, a user may click or point to the label. Once clicked, the label may dynamically generate information about the associated object. In an embodiment, the dynamically generated information is also presented to the user viewing image 114 such that the information does not interfere with image 114. For example, the dynamically generated information may replace or temporarily replace the position on image 114 that was occupied by a label.

In another embodiment, a label may include an input module that receives an action from a user. In one embodiment the label may include a link. When an image is presented a user, a user may click on the link which results in the user being routed to a website that is associated with a label. For example, when a label describes a restaurant on a ground floor of a building, a user may click on a label and be directed to a website associated with the restaurant or a website that displays the reviews for the restaurant or displays a menu. Similarly, when a label that includes a link points to the Eiffel Tower, a user may click on the link and be directed to a website that includes historical information of the Eiffel Tower, its hours of operation, a way to obtain tickets, etc.

In another embodiment, a label may provide a user with access to a search box or menu, such as a drop-down menu. A search box and a menu are exemplary input modules that receive an action from a user and facilitate access to browser 108 using street viewer 110. For example, label annotator 216 may include a label that becomes search box or a menu on image 114 when a user positions a cursor over the label. If, when a user uses the input module, the input module blocks an object in image 114, input module may also dynamically change positions to another object in image 114, where the menu does not interfere with the experience of the user.

When image processing system 116 generates image 114 and labels for image 114, image processing system 116 stores image 114 and the labels associated with image 114 in image database 112.

When a user requests image 114 using street viewer 110 for a particular real-world location, client 104 sends a request message for image 114 to image database 112 that includes geographic coordinates of the image. In response, image database 112 retrieves image 114 and labels associated with image 114, and forms a response message. The response message includes image 114 and the associated labels that image database 112 transmits to client 104. In an embodiment, image database 112 may transmit the response message directly to client 104 or through web server 106.

When client 104 receives a response message from web server 106, browser 108 uses street viewer 110 to present image 114 to a user. When a user views image 114, image 114 includes labels that include information about different objects in the image. The labels are position in image 114 such that the labels do not obstruct objects in image 114 that are interesting to the user.

Referring back to FIG. 1, while a separate image processing system 116 is shown for illustrative purposes, a person of skill in the art would recognize that its functional elements may be allocated between client 104 and web server 106. In another illustrative example, model generator 218 and image generator 212 may operate on a back-end server such as image processing system 116 or web server 106, and object identifier 214 and model generator 218 may operate on client 104.

Method

Figure 3:
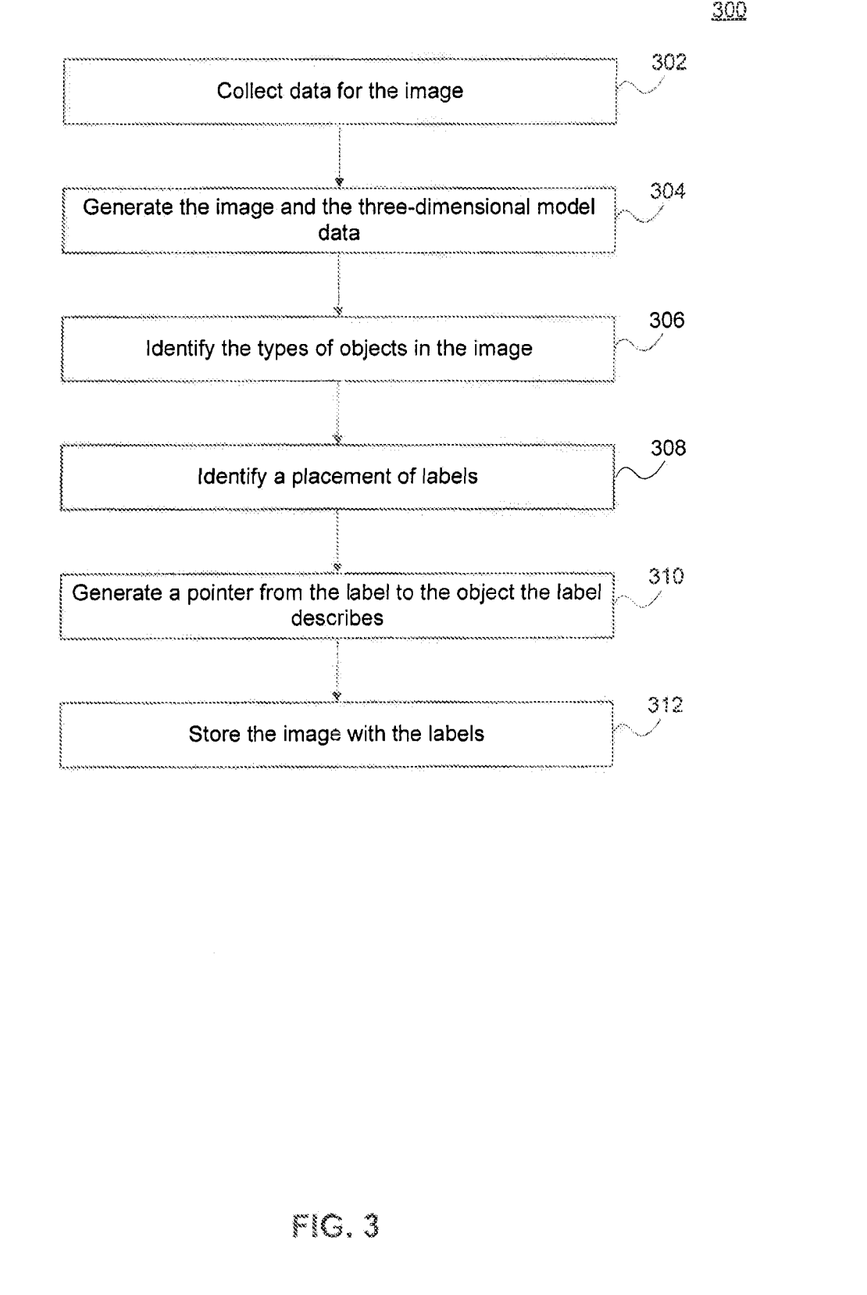
FIG. 3 is a flowchart of a method for identifying a placement of a label on the image, according to an embodiment.

FIG. 3 is a flowchart of a method 300 for identifying a placement of a label on an image, according to an embodiment.

At step 302, the data that generates an image is collected. For example, the data may be collected using at least a camera, a laser sensor and a GPS device. As described herein, the camera produces a picture of an image. The laser sensor produces a point cloud of one or more object included in the image and generates depth to the image. The GPS device produces the geographic coordinates of the location of the image in the real-world.

At step 304, an image and corresponding three-dimensional model are created from the collected data. For example, the data collected in step 302 is sent to image processing system 116 which may stitch together several images to generate image 114 and fit a three-dimensional model to the collected geographic points. In an embodiment, image 114 is a 3D image that may be reconstructed from multiple 2D images generated from the collected data.

At step 306, a type of an object in the image is identified. For example, object identifier 214 identifies objects in image 114 that represent buildings, windows, bridges, landmarks, street signs, restaurants or stores that are located in the buildings, roads, a sky, etc. Label annotator 216 uses the type of the object to determine whether the object requires a label and whether the object can include a label without interfering with the viewing experience of a user.

At step 308, a placement of labels in the image is determined. For example, label annotator 216 determines the objects in image 114 that require labels and objects that can display the labels. Once label annotator 216 identifies the objects that require labels, label annotator 216 annotates labels on the object in image 114 that can include the labels, in such a way that the labels do not obstruct the objects that are interesting to the user.

At an optional step 310, a pointer from a label to an object that the label describes is generated. For example, label annotator 216 generates a pointer from a label to the object in image 114 that the label describes. In an embodiment, label annotator 216 also includes a link associated with the label that once clicked, presents a user with information regarding the associated object.

At step 312, an image and labels are stored. For example, image 114 and the annotated labels are stored in image database 112.

Figure 4:
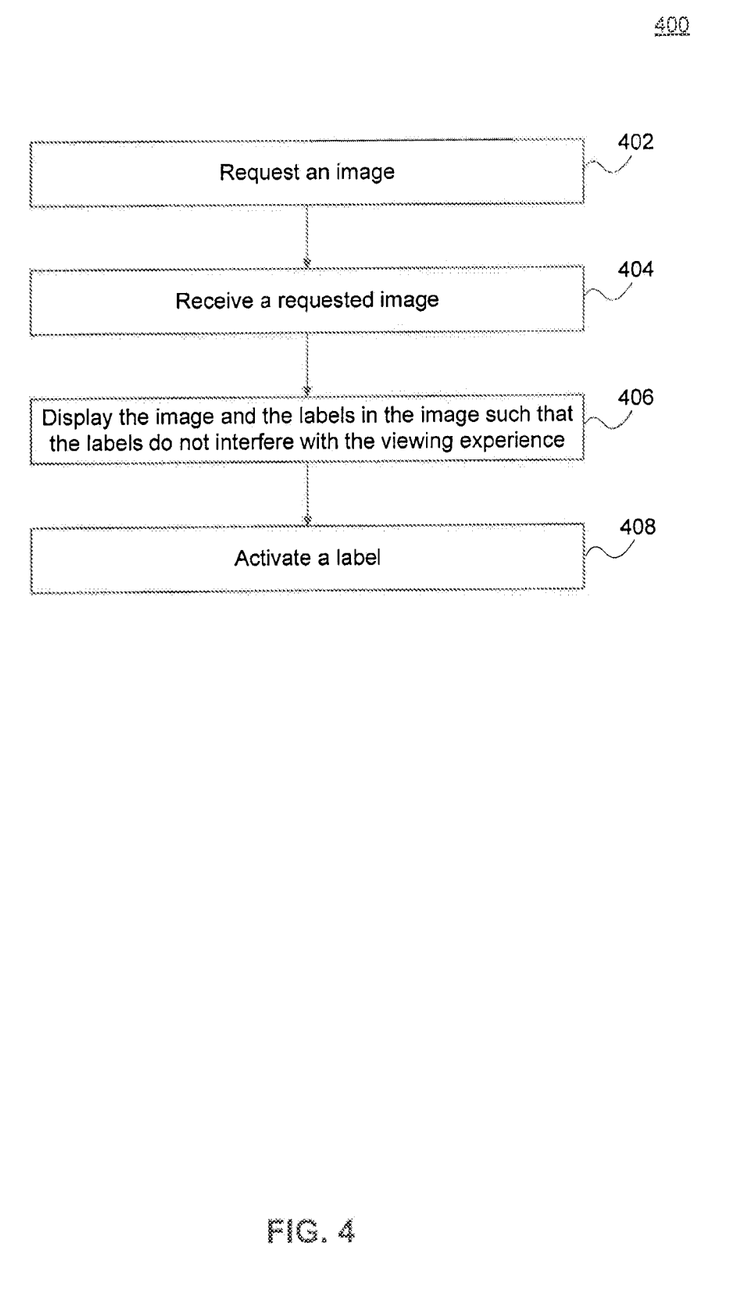
FIG. 4 is a flowchart of a method showing receiving an image with labels on a client device, according to an embodiment.

FIG. 4 is a flowchart of a method 400 for displaying an image with the labels on a client device, according to an embodiment.

At step 402, a client sends a request message for an image. For example, browser 108 uses street viewer 110 to request image 114 from image database 112.

At step 404, a client receives a response message that includes the requested image. For example, image database 112 retrieves image 114 and sends image 114 that includes annotated labels to client 104.

At step 406, an image is displayed. For example, street viewer 110 displays image 114 and the annotated labels. When street viewer 110 displays image 114, the labels are displayed on objects that do not interfere with the presentation of image 114 to the user. For example, as described herein, the labels for objects appear on objects that represent a road or a sky, such that they do not obstructs buildings, street signs, landmarks, restaurants, etc. In an embodiment, street viewer 110 may display pointers from the labels to the objects that the labels describe.

At step 408, a label is activated. For example, when image 114 includes a label that includes a link, a user may activate the label by clicking or pointing to the label. In response, the label may display information to the user about an object associated with the label. In another embodiment, once the user clicks on the link, the link may present a user with a menu that is also displayed on the objects in image 114 such that they do not block interesting portions of image 114.

Exemplary User Interface

Figure 5:
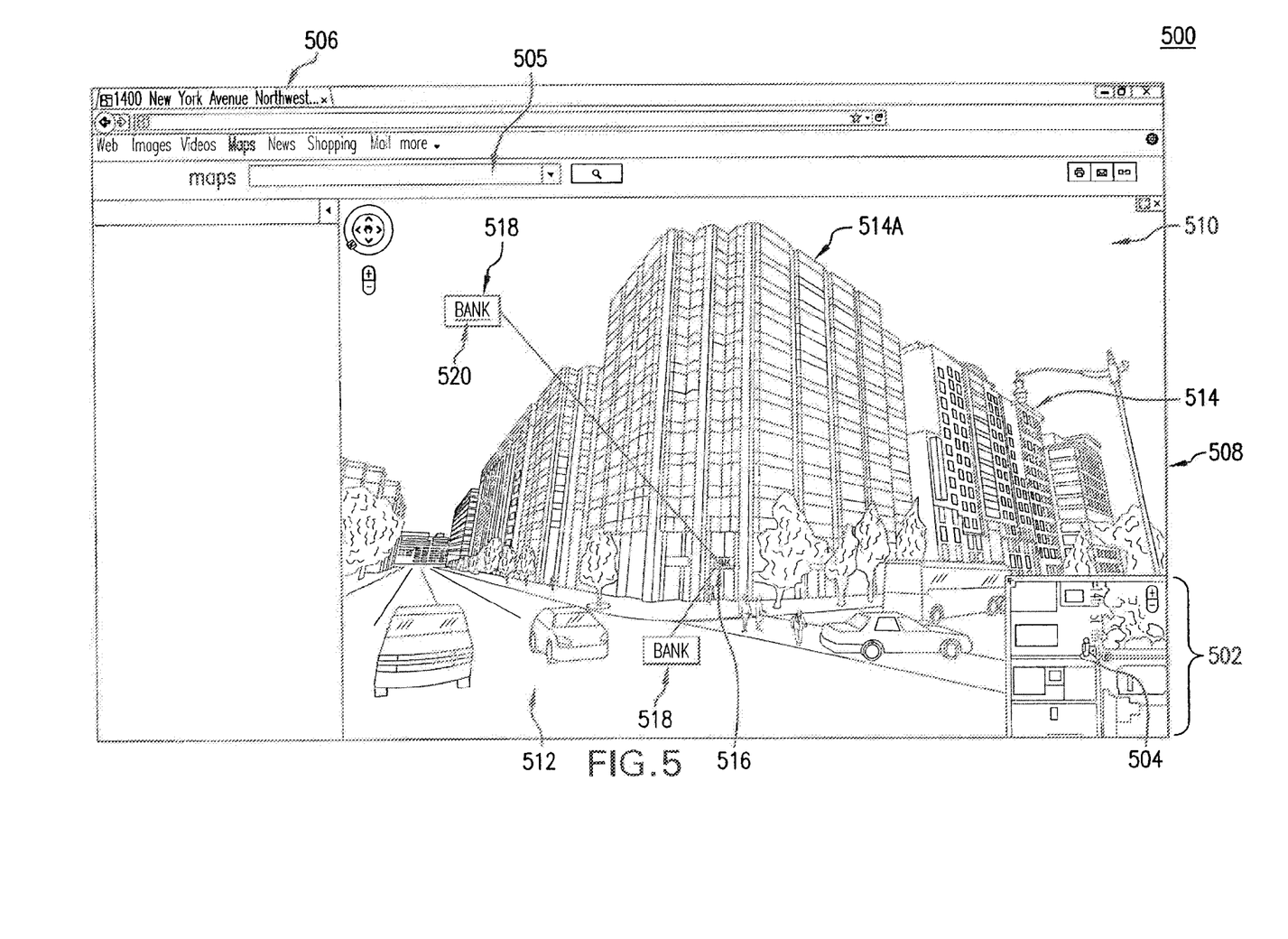
FIG. 5 is an exemplary embodiment of an image that includes labels . . . .

FIG. 5 is an exemplary user interface 500 that includes an image and labels. User interface 500 includes image 114 of a city block 508 that is presented to a user using street viewer 110. Street viewer 110 may also present a user with a map of a geographic location, such as map 502. In one embodiment, map 502 may be overlaid over a corner of image 114. Street viewer 110 uses a map pointer 504 included in map 502 to indicate the actual geographic location that corresponds to city block 508.

User interface 500 includes a search box 505. Search box 505 allows a user to enter an address of a geographic location for image 114 that may be presented to the user. Once the user enters the address of a geographic location, street viewer 110 uses the entered address to obtain the corresponding image 114 from image database 112. In one embodiment, street viewer 110 may display the user entered address using tab 506.

City block 508 presented as image 114 to a user may include multiple objects, such as a sky 510, a road 512, and multiple buildings 514, to name only a few. Sky 510, road 512, and building 514 are two-dimensional objects that object identifier 214 identifies from a three-dimensional model of image 114.

Buildings 514 that correspond to city block 508 may also include retail establishments, banks, etc., that require labels. For example, the ground floor of building 514a includes a bank 516. Unlike conventional systems where the label is overlaid directly on the image of the bank, or at a fixed offset from bank's location, city block 508 includes labels, such as labels 518 that are overlaid on objects that do not obstruct the image of bank 516 or building 514a. For example, in image 114 of city block 508, labels 518 are overlaid over sky 510 or road 512.

In one embodiment, label 518 includes a name of bank 516. In another embodiment, label 518 may also include a link 520. As described herein, link 520 may be a link to a website that includes information about bank 516, such as its operating hours, contact information, etc.

Exemplary Computer System

Figure 6:
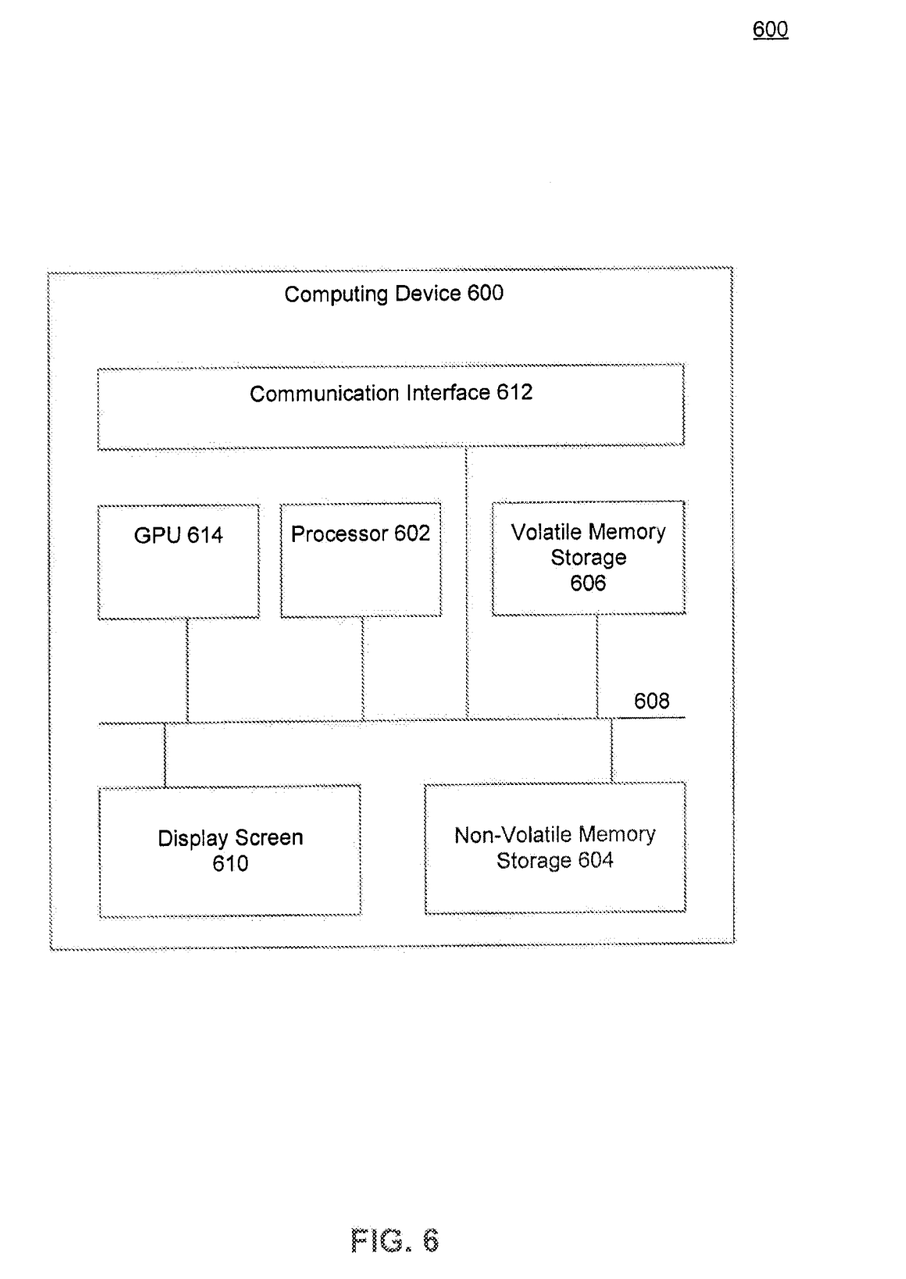
FIG. 6 is a block diagram of a computer system in which embodiments can be implemented.

FIG. 6 is a block diagram of a computer system in which embodiments of the invention can be implemented. For example, the components or modules of system 100, such as object identifier 214, label annotator 216 and model generator 218 may be implemented in one or more computer systems 600 using hardware, software, firmware, tangible computer-readable media having instructions stored thereon, or a combination thereof and may be implemented in one or more computer systems or other processing systems. Modules and components in FIGS. 1-5 may be embodied in hardware, software, or any combination thereof.

Client 104 or web server 106 may include one or more computing devices. Client 104 or web server 106 may include one or more processors 602, one or more non-volatile storage mediums 604, one or more memory devices 606, a communication infrastructure 608, a display screen 610 and a communication interface 612. Processors 602 may include any conventional or special purpose processor, including, but not limited to, digital signal processor (DSP), field programmable gate array (FPGA), and application specific integrated circuit (ASIC). Non-volatile storage 604 may include one or more of a hard disk drive, flash memory, and like devices that may store computer program instructions and data on computer-readable media. One or more of non-volatile storage device 604 may be a removable storage device. Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-usable medium. Such software, when executed in one or more data processing device, causes a data processing device(s) to operate as described herein. Embodiments of the invention employ any computer-usable or readable medium. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for labeling an image, comprising:
   receiving, with one or more computing devices, a two-dimensional, street-level image and a three-dimensional model representing at least a portion of the image's content;
   identifying, with the one or more computing devices, one or more objects in the two-dimensional, street level image;
   determining, with the one or more computing devices, object data for each of the one or more identified objects based at least in part on the three-dimensional model, wherein the object data includes an object type chosen from a set of three or more predetermined types, an object location, and an area occupied by the object;
   receiving, with the one or more computing devices, label data representing a label to annotate at least a portion of a given one of the one or more objects in the two-dimensional, street-level image; and
   using the determined object data to determine, with the one or more computing devices, a label position for presentation of the label within the two-dimensional, street-level image, such that the label does not obscure presentation of the given object in the two-dimensional, street-level image, wherein the object type is used to determine whether the label can be associated with the given object without obscuring the presentation.

2. The computer-implemented method of claim 1, further comprising:
   determining, using the three-dimensional model, an area of the two-dimensional, street-level image representing a road or sky,
   wherein the determined position for presentation of the label is within the determined area representing the road or sky.

3. The computer-implemented method of claim 1, further comprising:
   sending the determined label position to a client device, wherein the client device presents the two-dimensional, street-level image and the label within the two-dimensional image at the determined label position.

4. The computer-implemented method of claim 1, further comprising:
   generating a pointer for presentation within the two-dimensional, street-level image, the pointer illustrating that the label annotates the given object in the two-dimensional, street-level image.

5. The computer-implemented method of claim 1, wherein the label includes an input module.

6. The method of claim 1, wherein the object type is used to determine whether the given object requires the label and whether the given object can include the label without interfering with a viewing experience of a user.

7. The computer-implemented method of claim 1, further comprising:
   determining, using the three-dimensional model, an area of the two-dimensional, street-level image representing a sky by identifying portions of the three-dimensional model with an infinite "z" coordinate, wherein the determined label position is within the determined area representing the sky.

8. The computer-implemented method of claim 1, further comprising:
   determining, using the three-dimensional model, an area of the two-dimensional, street-level image representing a road by identifying portions of the three-dimensional model below a predetermined elevation, wherein the determined label position is within the determined area representing the road.

9. The computer-implemented method of claim 8, wherein the object type of at least one object in the two-dimensional, street level image is determined to be a building by detecting one or more vertical or substantially vertical facades adjacent to the determined area representing the road.

10. The computer-implemented method of claim 1, wherein the set of three or more predetermined types includes "building", "bridge", "street sign", "road", and "sky".

11. A system for labeling an image, comprising:
    one or more memories storing a two-dimensional, street-level image and a three-dimensional model representing at least a portion of the image's content;
    one or more processors in communication with the one or more memories and configured to:
    identify one or more objects in the two-dimensional, street-level image;
    determine object data for each of the one or more identified objects based at least in part on the three-dimensional model, wherein the object data includes an object type chosen from a set of three or more predetermined types, an object location, and an area occupied by the object;

receive label data representing a label to annotate at least a portion of a given one of the identified one or more objects in the two-dimensional, street-level image; and using the determined object data to determine a label position for presentation of the label within the two-dimensional, street-level image, such that the label does not obscure presentation of the given object in the two-dimensional, street-level image, wherein the object type is used to determine whether the label can be associated with the given object without obscuring the presentation.

12. The system of claim 11, wherein the one or more processors are further configured to provide for display the two-dimensional image and the label within the two-dimensional, street-level image at the determined position.

13. The system of claim 11, further comprising a communication interface configured to send the determined position to a client device, wherein the client device presents the two-dimensional, street-level image and the label within the two-dimensional image at the determined position.

14. The system of claim 11, wherein the one or more processors are further configured to generate a pointer for presentation within the two-dimensional, street-level image, the pointer illustrating that the label annotates the given object in the two-dimensional, street-level image.

15. The system of claim 11, wherein the one or more processors are further configured to:
   determine, using the three-dimensional model, an area of the two-dimensional, street-level image representing a road by identifying portions of the three-dimensional model below a predetermined elevation, wherein the determined label position is within the determined area representing the road.

16. The system of claim 15, wherein the object type of at least one object in the two-dimensional, street level image is determined to be a building by detecting one or more vertical or substantially vertical facades adjacent to the determined area representing the road.

17. The system of claim 11, wherein the set of three or more predetermined types includes "building", "bridge", "street sign", "road", and "sky".

18. An article of manufacture including a non-transitory computer-readable medium having instructions retrieved thereon that, when executed by one or more processors, cause the one or more processors to perform operations for labeling an image, comprising:

receiving a two-dimensional, street-level image and a three-dimensional model representing at least a portion of the image's content;

identifying one or more objects in the two-dimensional, street-level image;

determining object data for each of the one or more identified objects based at least in part on the three-dimensional model, wherein the object data includes an object type chosen from a set of three or more predetermined types, an object location, and an area occupied by the object;

receiving label data representing a label to annotate at least a portion of a given one of the one or more objects in the two-dimensional, street-level image; and using the determined object data to determine a label position for presentation of the label within the two-dimensional, street-level image, such that the label does not obscure presentation of the given object in the two-dimensional, street-level image, wherein the object type is used to determine whether the label can be associated with the given object without obscuring the presentation.

19. The non-transitory computer-readable medium of claim 18, wherein the instructions that cause the one or more processors to perform operations for labeling the image, further comprise instructions to perform operations comprising:
   sending the determined label position to a client device, wherein the client device presents the two-dimensional, street-level image and the label within the two-dimensional, street-level image at the determined label position.

20. The non-transitory computer-readable medium of claim 18, wherein the instructions that cause the one or more processors to perform operations for labeling the image, further comprise instructions to perform operations comprising:
   generating a pointer for presentation within the two-dimensional, street-level image, the pointer illustrating that the label annotates the given object in the two-dimensional, street-level image.

21. The non-transitory computer-readable medium of claim 18, wherein the label includes a link to information about the given object.

22. A computer-implemented method for labeling an image, comprising:
   receiving, with one or more computing devices, a two-dimensional, street-level image and a three-dimensional model representing at least a portion of the image's content, wherein the three-dimensional model is generated, in part, by using a search and optimization technique comprising:
      selecting a shape from a plurality of primitive shapes; and
      defining geometric parameters of the shape to fit a portion of a point cloud representation of dimensions of one or more objects in the two-dimensional, street level image;
   identifying, with the one or more computing devices, one or more objects in the two-dimensional, street level image;
   determining, with the one or more computing devices, object data for each of the one or more identified objects based at least in part on the three-dimensional model, wherein the object data includes an object type, an object location, and an area occupied by the object;
   receiving, with the one or more computing devices, label data representing a label to annotate at least a portion of a given one of the one or more objects in the two-dimensional, street-level image; and
   determining, with the one or more computing devices and based on the determined object data, a label position for presentation of the label within the two-dimensional, street-level image, such that the label does not obscure presentation of the given object in the two-dimensional, street-level image, wherein the object type is used to determine whether the label can be associated with the given object without obscuring the presentation.

23. The computer-implemented method of claim 22, wherein the object type is chosen from a set of three or more predetermined types and the set of three or more predetermined types includes "building", "bridge", "street sign", "road", and "sky".

* * * * *